(12) United States Patent
Neureiter

(10) Patent No.: US 9,882,315 B2
(45) Date of Patent: Jan. 30, 2018

(54) CONNECTION DEVICE

(71) Applicant: ROSENBERGER HOCHFREQUENZTECHNIK GMBH & CO. KG, Fridolfing (DE)

(72) Inventor: Franz Josef Neureiter, Haigermoos (AT)

(73) Assignee: Rosenberger Hochfrequenztechnik GmbH & Co. KG, Fridolfing (DE)

( * ) Notice: Subject to any disclaimer, the term of this patent is extended or adjusted under 35 U.S.C. 154(b) by 244 days.

(21) Appl. No.: 14/649,329

(22) PCT Filed: Nov. 14, 2013

(86) PCT No.: PCT/EP2013/003440
§ 371 (c)(1),
(2) Date: Jun. 3, 2015

(87) PCT Pub. No.: WO2014/090365
PCT Pub. Date: Jun. 19, 2014

(65) Prior Publication Data
US 2015/0311639 A1 Oct. 29, 2015

(30) Foreign Application Priority Data
Dec. 10, 2012 (DE) .................... 20 2012 011 808 U

(51) Int. Cl.
*H02K 11/00* (2016.01)
*H01R 13/6581* (2011.01)
(Continued)

(52) U.S. Cl.
CPC ........... *H01R 13/6581* (2013.01); *B60K 1/00* (2013.01); *H01R 13/6315* (2013.01);
(Continued)

(58) Field of Classification Search
CPC ....................... H01R 13/6581; H01R 13/6315; H01R 24/38; B60K 1/00; H02K 11/0094
(Continued)

(56) References Cited

U.S. PATENT DOCUMENTS 4,351,582 A 9/1982 Emerson
4,408,816 A * 10/1983 Knecht .............. H01R 13/6592
439/470

(Continued)

FOREIGN PATENT DOCUMENTS

CN 202004166 U 10/2011
CN 102449858 A 5/2012
(Continued)

*Primary Examiner* — Robert W Horn
(74) *Attorney, Agent, or Firm* — DeLio, Peterson & Curcio, LLC; Robert Curcio

(57) ABSTRACT

A connection device for connecting electric components in an electrically conducting manner. The connection device having a first contact element for making contact with a corresponding mating contact element of a first component, a second contact element for making contact with a corresponding mating contact element of a second component, a flexible conductor which connects the first contact element to the second contact element in an electrically conducting manner, and a housing which surrounds the conductor and accommodates the first contact element in a first accommodating part and the second contact element in a second accommodating part. The housing is designed in such a way as to allow a relative movement between the first accommodating part and the second accommodating part.

14 Claims, 5 Drawing Sheets

(51) Int. Cl.
  *B60K 1/00* (2006.01)
  *H01R 13/631* (2006.01)
  *H01R 24/38* (2011.01)
  *H01R 13/502* (2006.01)
  *H01R 105/00* (2006.01)

(52) U.S. Cl.
  CPC ......... *H01R 24/38* (2013.01); *H02K 11/0094* (2013.01); *B60Y 2400/61* (2013.01); *H01R 13/5025* (2013.01); *H01R 2105/00* (2013.01); *H01R 2201/26* (2013.01)

(58) Field of Classification Search
  USPC .......................................................... 310/71
  See application file for complete search history.

(56) References Cited

U.S. PATENT DOCUMENTS

| | | | |
|---|---|---|---|
| 4,822,286 A | 4/1989 | Bianca | |
| 5,073,127 A * | 12/1991 | Daly | H01R 23/661 439/473 |
| 6,190,737 B1 * | 2/2001 | Roche | B05D 5/068 257/E23.114 |
| 6,533,963 B1 * | 3/2003 | Schleifstein | C08K 9/02 252/500 |
| 6,716,071 B2 * | 4/2004 | Miyazaki | H01R 43/20 439/421 |
| 6,746,284 B1 * | 6/2004 | Spink, Jr. | H01R 13/115 439/651 |
| 6,821,160 B2 * | 11/2004 | Fink | H01R 13/512 439/595 |
| 6,837,728 B2 * | 1/2005 | Miyazaki | H01R 9/032 439/271 |
| 6,945,817 B2 * | 9/2005 | Miyazaki | H01R 9/0521 439/578 |
| 7,150,631 B2 * | 12/2006 | Reed | H01R 4/307 439/34 |
| 7,264,506 B2 * | 9/2007 | Mori | H01R 11/03 439/559 |
| 7,329,145 B2 * | 2/2008 | Yagome | H01R 13/506 439/271 |
| 7,393,218 B1 * | 7/2008 | Pavlovic | H01R 4/646 439/939 |
| 7,465,196 B2 * | 12/2008 | Duarte | H01R 13/567 439/394 |
| 7,575,476 B2 * | 8/2009 | Tyler | H01R 13/65802 439/101 |
| 7,614,910 B2 * | 11/2009 | Croteau | H01R 13/512 439/559 |
| 7,618,286 B2 * | 11/2009 | Aoki | H01R 13/652 439/587 |
| 7,637,761 B1 * | 12/2009 | Arnold | B60R 16/0215 439/212 |
| 7,789,690 B1 * | 9/2010 | Rhein | H01R 13/53 439/310 |
| 8,152,574 B2 * | 4/2012 | Matsuoka | H01R 4/302 439/587 |
| 8,257,096 B2 * | 9/2012 | Matsuoka | H01R 13/504 439/626 |
| 8,408,927 B2 * | 4/2013 | Tashiro | H01R 4/70 439/247 |
| 8,408,943 B2 * | 4/2013 | Okamoto | H01R 13/6593 439/607.41 |
| 8,545,265 B2 * | 10/2013 | Sakamoto | B29C 45/14 439/606 |
| 8,597,062 B2 * | 12/2013 | Casses | H01R 4/184 439/686 |
| 8,672,700 B2 * | 3/2014 | Matsumoto | H01M 2/20 439/364 |
| 8,827,747 B2 * | 9/2014 | Tanaka | H01R 13/6581 439/607.27 |
| 8,956,172 B2 * | 2/2015 | Matsumoto | H01R 13/5219 200/50.1 |
| 9,048,587 B2 * | 6/2015 | Marsh | H01R 11/12 |
| 9,059,534 B2 * | 6/2015 | Endo | H01R 13/5205 |
| 9,071,023 B2 * | 6/2015 | Kondo | H01R 9/18 |
| 9,105,998 B2 * | 8/2015 | Uno | H01R 13/6315 |
| 9,281,627 B2 * | 3/2016 | Fujiwara | H01R 13/6581 |
| 9,312,626 B2 * | 4/2016 | Itsuki | H01R 13/5208 |
| 9,318,849 B2 * | 4/2016 | Kobayashi | H01R 13/5205 |
| 9,425,541 B2 * | 8/2016 | Data | H01R 24/28 |
| 9,531,100 B2 * | 12/2016 | Fukushima | H01R 13/08 |
| 2010/0046189 A1 * | 2/2010 | Hasegawa | H01R 13/6593 361/816 |
| 2010/0093231 A1 * | 4/2010 | Lauermann | H01R 13/5205 439/852 |
| 2010/0248529 A1 * | 9/2010 | Adachi | H02G 3/0437 439/447 |
| 2011/0316372 A1 | 12/2011 | Kobayashi | |
| 2012/0040553 A1 | 2/2012 | Tashiro | |
| 2013/0078835 A1 * | 3/2013 | Gunreben | H01R 13/658 439/188 |
| 2015/0118902 A1 * | 4/2015 | Data | H01R 24/28 439/587 |
| 2015/0311639 A1 * | 10/2015 | Neureiter | B60K 1/00 310/71 |

FOREIGN PATENT DOCUMENTS

| | | |
|---|---|---|
| DE | 10 2009 040 896 A1 | 3/2011 |
| EP | 2498383 A1 | 11/2012 |
| JP | S63159287 A | 7/1988 |
| WO | 2011055806 A1 | 5/2011 |

* cited by examiner

CONNECTION DEVICE

BACKGROUND OF THE INVENTION

1. Field of the Invention

The invention relates to a connection device for connecting electrical components, for example components of an electrical drive unit of a motor vehicle, in an electrically conductive manner.

2. Description of Related Art

It is known for compact electrical drive units to be integrated in (partially) electrically driven motor vehicles, which comprise at least one electrical drive motor and a transmission directly flanged to this, as well as a power electronics system. Such a drive unit is, for example, known from DE 10 2009 040 896 A1. In this case the power electronics are arranged in immediate proximity to the drive motor, but are not fixed directly to this but to a cross-beam of the chassis of the motor vehicle. An electrical connection between the power electronics system and the drive motor can then be effected in a known manner via cables, wherein the distance to be bridged by means of the cable is very short due to the spatial proximity of the drive motor and power electronics. One advantage of the electrical connection of power electronics and drive motor by means of cables is that as a result of their flexibility these are able to compensate relative movements between these components, which occur as a result of their mutually independent attachment to the structure of the motor vehicle. However, a disadvantage of such a type of electrical connection is, in particular, the increased amount of work involved in assembly.

It would therefore be advantageous to exploit the spatial proximity between the power electronics and the drive motor in the drive unit according to DE 10 2009 040 896 A1 in order to connect these two components directly with one another electrically, in that contact elements of the power electronics make direct contact with the associated mating contact elements of the drive motor. A relative movement between the contact elements resulting from the independent attachment of the components to the structure of the motor vehicle could be compensated in that the associated contact elements of the two components can slide against one another. However, in this case the wear caused by the sliding can be problematic, since it can have a negative influence on the service life and also in particular on the operating reliability of the electrical connection.

SUMMARY OF THE INVENTION

Starting out from this prior art the invention was based on the object of advantageously making possible the electrical connection of components which are arranged in spatial proximity to one another and which may possibly move relative to one another, within certain limits, such as, in particular, a drive motor and a power electronics system of an electrical drive unit for a motor vehicle, such as is known from DE 10 2009 040 896 A1.

This problem is solved through a connection device according to the independent claims. An electrical drive unit for a motor vehicle derived from a preferred use of such a connection device is the subject matter of the claims. Advantageous embodiments of the connection device according to the invention and the drive units according to the invention are the subject matter of preferred embodiments, and are explained in the following description of the invention.

The above and other objects, which will be apparent to those skilled in the art, are achieved in the present invention which is directed to a connection device for the electrically conductive connection of electrical components, comprising: a first contact element, which is intended to make contact with a corresponding mating contact element of a first of the components; a second contact element, which is intended to make contact with a corresponding mating contact element of a second of the components; a flexible conductor which connects the first contact element with the second contact element in an electrically conductive manner; and a housing which encloses the conductors and, in a first mounting part, accommodates the first contact element and, in a second mounting part, accommodates the second contact element, wherein the housing is formed in such a way that this permits a relative movement between the first mounting part and the second mounting part, wherein a housing section connecting the mounting parts is formed of an elastomer and is flexible.

The mounting parts may be rigid in design. The mounting parts may further possess connecting means for fixing the connection device to the components.

The conductors preferably run a curved form within the housing in an unloaded initial state of the housing. More preferably, the conductor is designed in the form of a ground strap.

The housing forms a shield, and preferably, the housing includes a material having metallic particles. The elastomer may include metallic particles.

The contact elements are designed in the form of plug contact elements.

In a second aspect, the present invention is directed to an electrical drive unit for a motor vehicle including at least two components connected in an electrically conductive manner by a connection device comprising: a first contact element, which is intended to make contact with a corresponding mating contact element of a first of the components; a second contact element, which is intended to make contact with a corresponding mating contact element of a second of the components; a flexible conductor which connects the first contact element with the second contact element in an electrically conductive manner; and a housing which encloses the conductors and, in a first mounting part, accommodates the first contact element and, in a second mounting part, accommodates the second contact element, wherein the housing is formed in such a way that this permits a relative movement between the first mounting part and the second mounting part, wherein a housing section connecting the mounting parts is formed of an elastomer and is flexible.

The electrical drive unit includes a power electronics system connected with an electrical drive motor operated with high voltage by the connection device.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

DESCRIPTION OF THE PREFERRED EMBODIMENT(S)

Figure 1:
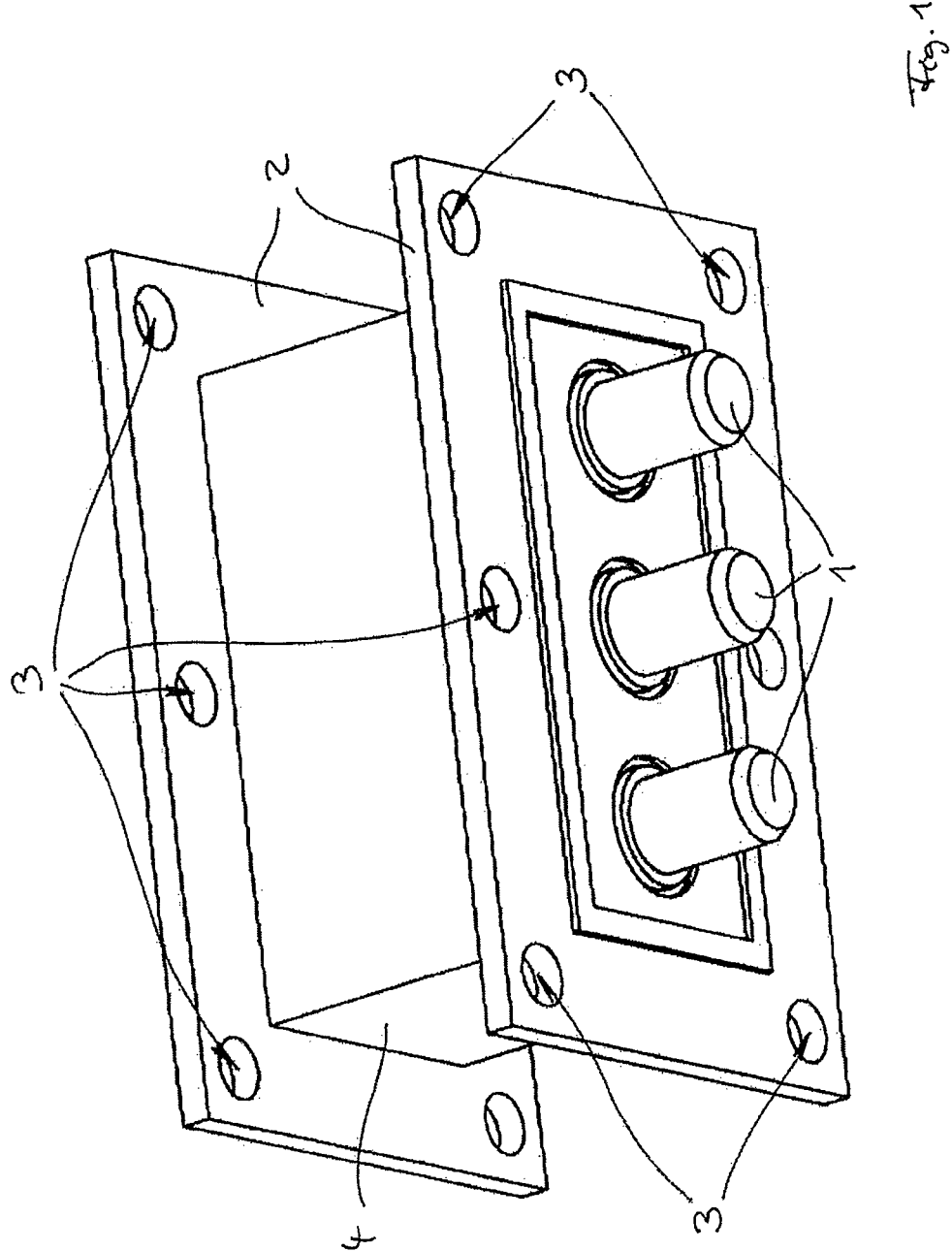
FIG. 1 shows a perspective view of a connection device according to the invention.
Figure 2:
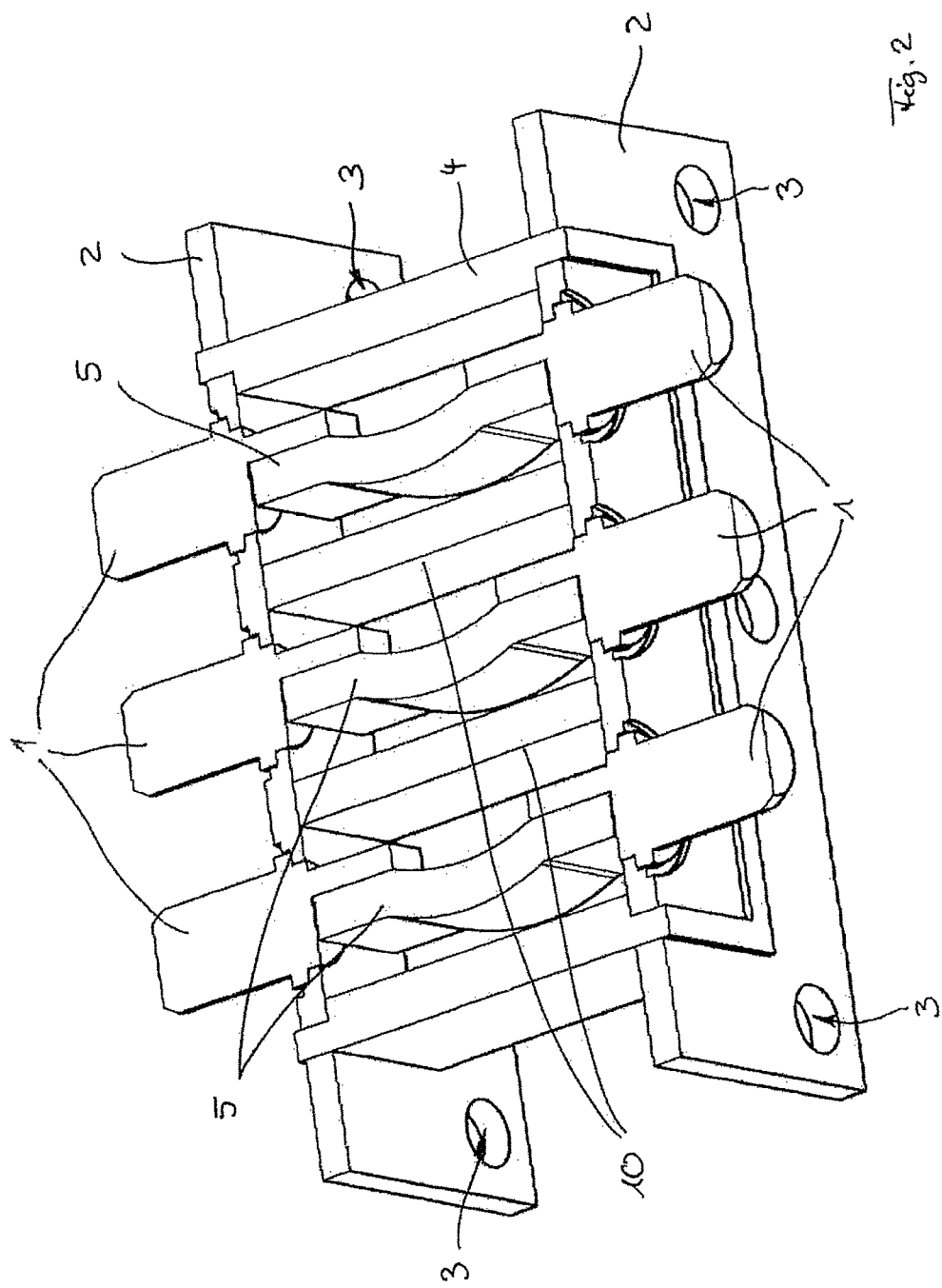
FIG. 2 shows a perspective cross section of the connection device according to FIG. 1.

In describing the preferred embodiment of the present invention, reference will be made herein to FIGS. 1-4 of the drawings in which like numerals refer to like features of the invention.

A connection device for the electrically conductive connection of electrical components according to the invention comprises: at least one, preferably several first contact elements, which are intended to make contact with one/several corresponding mating contact elements of a first of the components: at least one, preferably several second contact elements, which are intended to make contact with one/several corresponding mating contact elements of a second of the components; a number of flexible conductors, corresponding, in particular, to the number of the first or second contact elements which each connect a first contact element with a second contact element in an electrically conductive manner; and a (preferably largely or completely closed) housing which encloses the conductor(s) and, in a first mounting part, accommodates the first contact element(s) (preferably immovably) and, in a second mounting part, accommodates the second contact element(s) (preferably immovably), wherein the housing is formed in such a way that this permits or does not impede a relative movement between the first mounting part and the second mounting part.

Electrical components arranged in spatial proximity to one another can be electrically connected with one another by the connection device according to the invention, wherein, as a result of the flexibility of the conductors in combination with the corresponding design of the housing enclosing the conductor(s), relative movements can be absorbed, even without the use of sliding contact points. The connection device according to the invention is thus not subject to any increased wear caused through the relative movements and can thus guarantee a secure electrical connection over a long period. In comparison with the connection of electrical components by simple cables known from the prior art, the connection device according to the invention is distinguished through its simplicity of handling as a unit comprising several transmission paths.

In a preferred embodiment of the connection device according to the invention it can be the case that the mounting parts are rigid in design, as a result of which an immovable positioning of the contact elements can be achieved which can be advantageous in ensuring a reliable contact with the associated mating contact elements.

The property of the housing of permitting a relative movement is preferably achieved in that a housing section connecting the mounting parts is of flexible design. This is thus able to deform, as a result of which the relative movements of the components electrically connected by means of the connection device can be absorbed. However, according to alternative embodiments the property of the housing of permitting a relative movement can also be achieved in that two or more housing sections are moveable relative to one another and in particular can be slid into one another in a telescopic manner.

The flexibility of the housing sections connecting the mounting parts can in particular result from a corresponding flexibility and in particular elasticity of the material (or several materials) used for this housing section. For this purpose, the housing section can at least partially be formed of an elastomer (for example based on natural rubber or silicone rubber). Alternatively or additionally, however, it is also possible to achieve the flexibility of the housing section through structural measures (for example integrated articulations).

In order to ensure a secure and long-lasting connection of the components by means of the connection device, the mounting parts can also be provided with connection means (for example bores, plunger pins or clamping pins, snap-in hooks, etc.) for fixing the connection device to the components. A preferably rigid design of the mounting parts can thereby improve the fixing of the connection device to the components.

In a further preferred embodiment of the connection device according to the invention it can be the case that, in an unloaded initial state of the housing (i.e., in which it is not subjected to forces originating from the components), the conductor(s) run(s) in a curved path (also multiply curved, for example, S-formed) within the housing. This makes it possible to ensure that relative movements between the components which lead to the distance between the contact elements being enlarged in comparison with the initial state can also be compensated by the conductor(s), without these needing to be expanded.

Preferably, it can be the case that the conductor(s) is designed in the form of a ground strap or are formed by ground straps. These are flexible electrical conductors, in particular rectangular conductors or ribbon conductors, consisting of a wire braid (for example made of copper wire). Such conductors are in particular suitable for the preferred use of the connection device according to the invention for the transmission of high currents (in particular currents which can reach or exceed 100 A) between the components, since despite being suitable for high currents these can display good flexibility.

In a further preferred embodiment of the connection device according to the invention, the housing forms a shield in that the housing is at least partially electrically conductive in design. For this purpose, the housing can, for example, be completely or partially made of metal. Also, the housing or at least of a part thereof can be provided with a metallic coating. Preferably, a material of the housing contains metallic particles, as a result of which the shielding effect is created. This can, particularly preferably, be achieved if the housing is formed at least partially of one or several elastomers which can then contain the metallic particles.

In order to ensure a simply achieved yet secure contact between the contact elements of the connection device according to the invention and the mating contact elements of the components, it can further be the case that the contact elements are designed in the form of plug contact elements which form plug connections with the mating plug contact elements. Particularly preferably, the plug contact elements of the connection device according to the invention can be pin-formed and designed to plug into complementary socket-formed mating plug contact elements of the components. Among other things this makes it possible to integrate the mating plug contact elements in the components in a countersink arrangement, as a result of which a contact protection can be achieved for the mating plug contact elements, which potentially carry high voltage.

An advantageous use of a connection device according to the invention can involve connecting at least two components in an electrical (traction) drive unit for a motor vehicle in an electrically conductive manner. This is in particular the case if these components are arranged in spatial proximity to one another and/or integrated in the motor vehicle in such a way that when the motor vehicle is in operation a limited relative movement between these can occur.

In particular, the connection device can be used to connect a power electronics system with an electrical drive motor operated with high voltage (i.e., this serves as the electrical traction drive of the motor vehicle). Such a power electronics system comprises at least one inverter which converts a DC voltage, supplied for example by a traction battery of the motor vehicle, into an AC voltage and in particular a 3-phase AC voltage for the drive motor.

According to the invention, "high voltage" is understood to mean an electrical voltage of at least 30 V in the case of AC voltage and at least 60 V in the case of DC voltage.

The embodiment of a connection device according to the invention shown in the drawings comprises two groups of three pin-formed, metallic (plug) contact elements 1. The contact elements 1 of each group are, respectively, immovably arranged in a mounting part 2 of a housing. The mounting parts 2 are for this purpose provided with corresponding through-openings, through which the contact elements 1 extend. Plug-side ends of the contact elements 1 thereby project from the housing, whereas their conductor-side ends project into the housing. A connection of the contact elements 1 with the mounting parts 2 can, for example, be effected in a force-locking or form-locking manner, and/or by means of material engagement (for example through adhesive bonding).

The mounting parts 2, which are rectangular in form, are formed of a largely rigid material (for example plastic) and possess fixing apertures 3, through which fixing or securing elements (for example locking bolts or threaded bolts) can be inserted in order to fix the connection device to the components which are to be electrically connected.

The housing further comprises a housing section 4 connecting the mounting parts 2 which is formed of an elastomer and therefore displays relatively high flexibility (also, in particular, elasticity). This allows the two mounting parts 2 to move relative to one another, within limits, in any direction.

Two contact elements 1 arranged opposite one another within the housing are connected by a conductor 5 in the form of a ground strap. A connection between the conductor-side ends of the contact elements 1 and the conductors 5 can for example be effected through soldering. Designing the conductors 5 in the form of ground straps makes it possible, despite their being suitable for the transmission of high currents due to the relatively large cross sections, for these to be comparatively flexible, so that these too do not impede a relative movability between the mounting parts 2. The conductors are surrounded by an electrically insulating sheath.

In the initial state of the connection device, i.e., in the form which the housing assumes as a result of its inherent stability in a state in which it is not subjected to any external loads, the conductors 5 are already arranged in a curved form. This makes it possible to ensure that relative movements between the two mounting parts 2, which lead to the distance between these being enlarged, can also be absorbed by the conductors 5, without these needing to be expanded. In the case of the housing, in contrast, the housing section 4 connecting the mounting parts 2 is expanded. If, in contrast, a relative movement leads to a reduction in the distance between the mounting parts 2, this is compensated by the conductors 5 through a reduction in the radius of curvature of the curved arrangement. The housing section 4 is thereby compressed or otherwise deformed (bulged out or bent).

A plurality of electrical particles (not shown) is distributed within the elastomer of the housing sections 4 connecting the mounting parts. These form a shield for the conductors 5 arranged within the housing, thus reducing the absorption and/or emission of electrical or magnetic fields. This shielding effect is further enhanced in that, in addition to a section surrounding the conductors 5, the housing section 4 also includes two dividing walls 10 which each separate the outermost of the three conductors 5 spatially from the middle conductor 5.

Figure 3:
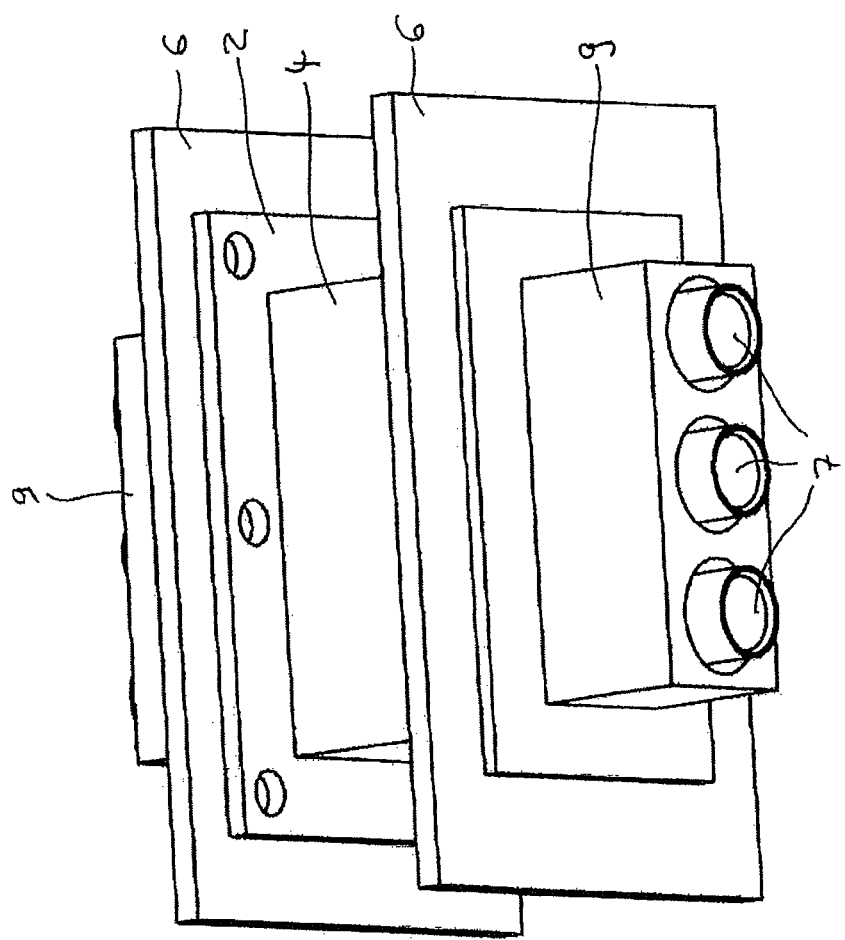
FIG. 3 shows a perspective view of a drive unit according to the invention with two components which are to be connected in an electrically conductive manner by the connection device according to FIGS. 1 and 2.
Figure 4:
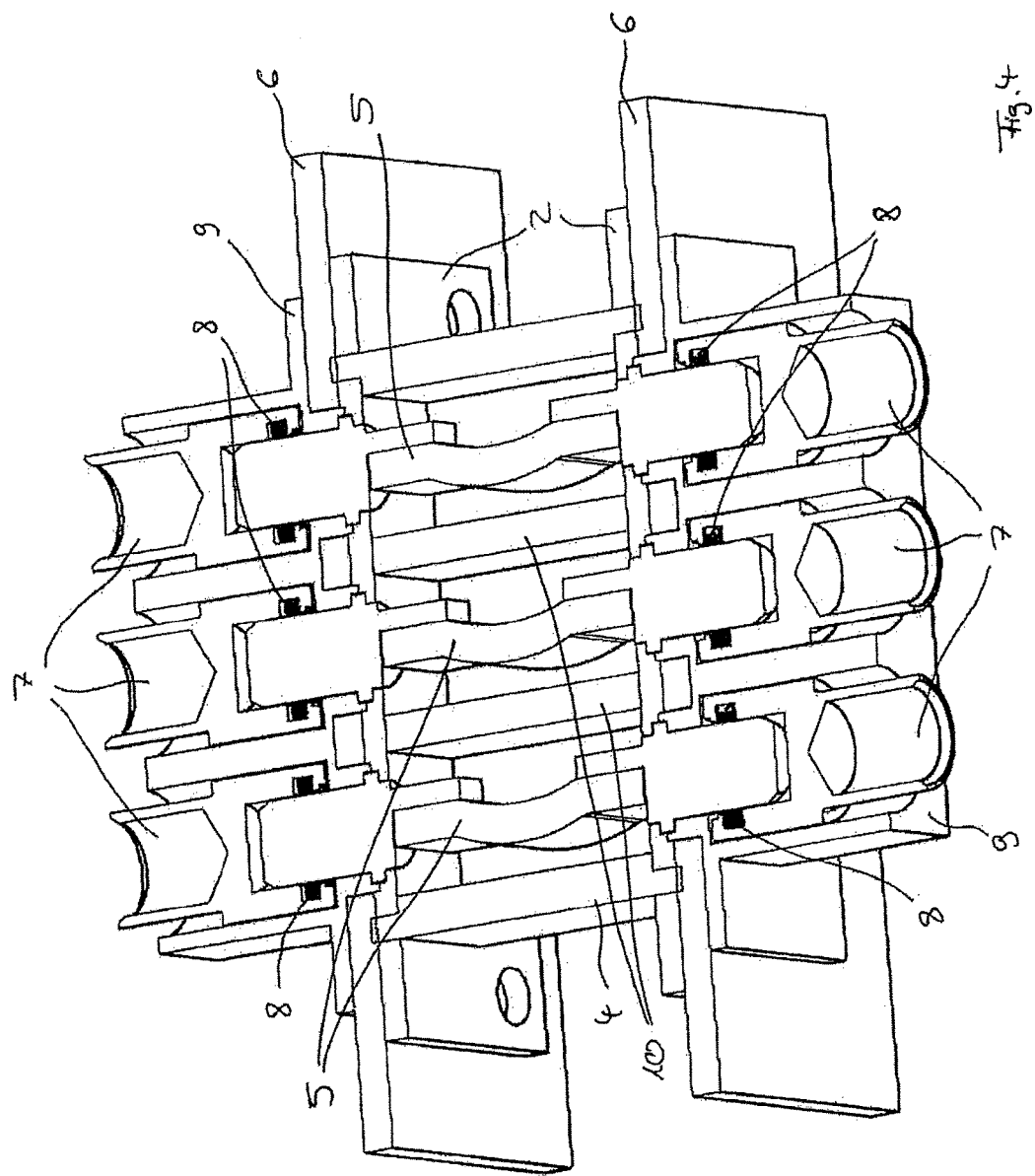
FIG. 4 shows a perspective cross section of the drive unit according to FIG. 3.

FIGS. 3 and 4 show how two electrical components of a drive unit for a motor vehicle according to the invention are connected with one another in an electrically conductive manner by the connection device.

In each case, only a part of a housing 6 as well as a plug connector part of the components are shown. Each of these plug connector parts comprises three (mating) contact elements 7, the plug-side ends of which are socket-formed and into which the plug-side ends of the associated pin-formed contact elements 1 of the connection device are plugged. In each case a radially widened, annular helical spring 8, which is arranged in a peripheral groove in the plug-side end of the respective mating contact element 7, ensures that a secure electrical contact is made.

The conductor-side ends of the mating contact elements 7 each possess a blind hole-like opening for accommodating and fixing (for example by soldering) a stripped end of a cable conductor (not shown).

The mating contact elements 7 are fixed in a housing 9 of the relevant plug connector part. The housings 9 of the plug connector parts are in turn fixed to the housings 6 of the associated components. A mechanical connection between the components and the respective mounting part 2 of the connection device can be achieved (in addition to the mechanical connection effected through the plug connections) by the fixing apertures 3 in the mounting parts 2 of the connection device and corresponding fixing means (not shown).

Despite the largely immovable connection between the components and the connection device in the regions of the contact points, the flexible design of the conductors 5 as well as of the housing sections 4 connecting the mounting parts 2 allow a relative movement between the two components.

The relative movement between the components, which can for example amount to 1 cm, can for example result from these not being fixed to each other, but attached independently of one another to the structure of the motor vehicle.

The components can for example comprise a power electronics system and an electrical drive motor for a motor vehicle. The power electronics system supplies the drive motor with electrical energy in the form of 3-phase AC voltage. Accordingly, the connection device also forms three transmission paths.

Figure 5:
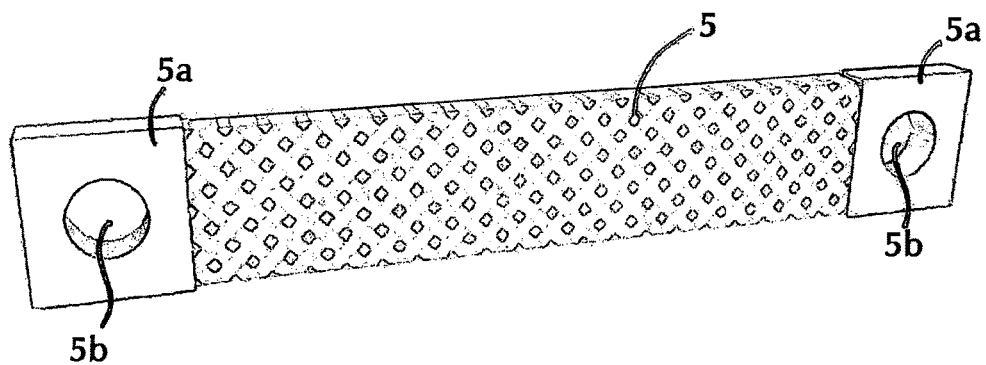
FIG. 5 shows an alternative embodiment of the conductor in the form of a ground strap.

FIG. 5 shows an alternative embodiment of the conductor 5. In this alternative embodiment, the conductor 5 is designed in the form of a ground strap. This means that the conductor 5 is in the form of a flat band conductor made from braided conductive leads or wires, such as for example, copper leads. At each end of the flat band conductor is provided a metal lug 5a having a through hole 5b in order to fix the ends of the ground strap to the first and second contact elements 1.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

Thus, having described the invention, what is claimed is:

1. A connection device for the electrically conductive connection of electrical components, comprising:
   a first contact element, which is intended to make contact with a corresponding mating contact element of a first of the components;
   a second contact element, which is intended to make contact with a corresponding mating contact element of a second of the components;
   a flexible conductor which connects the first contact element with the second contact element in an electrically conductive manner; and
   a housing which encloses the conductors and, in a first mounting part, accommodates the first contact element and, in a second mounting part, accommodates the second contact element, wherein the housing is formed in such a way that this permits a relative movement between the first mounting part and the second mounting part, wherein a housing section connecting said first and second mounting parts is formed of an elastomer and is flexible.

2. The connection device of claim 1, wherein said first and second mounting parts are rigid in design.

3. The connection device of claim 1, wherein said first and second mounting parts possess connecting means for fixing the connection device to the components.

4. The connection device of claim 1, wherein the conductors run in a curved form within the housing in an unloaded initial state of the housing.

5. The connection device of claim 1, wherein the conductor is designed in the form of a ground strap.

6. The connection device of claim 1, wherein the housing forms a shield.

7. The connection device of claim 6, wherein a material of the housing includes metallic particles.

8. The connection device of claim 1, wherein the elastomer includes metallic particles.

9. The connection device of claim 1 wherein the contact elements are designed in the form of plug contact elements.

10. The connection device of claim 3, wherein the conductors run in a curved form within the housing in an unloaded initial state of the housing.

11. The connection device of claim 10, wherein the conductor is designed in the form of a flat band conductor with braided conductive leads.

12. The connection device of claim 7, wherein the elastomer includes metallic particles.

13. An electrical drive unit for a motor vehicle including at least two components connected in an electrically conductive manner by a connection device comprising:
   a first contact element, which is intended to make contact with a corresponding mating contact element of a first of the components;
   a second contact element, which is intended to make contact with a corresponding mating contact element of a second of the components;
   a flexible conductor which connects the first contact element with the second contact element in an electrically conductive manner; and
   a housing which encloses the conductors and, in a first mounting part, accommodates the first contact element and, in a second mounting part, accommodates the second contact element, wherein the housing is formed in such a way that this permits a relative movement between the first mounting part and the second mounting part, wherein a housing section connecting said first and second mounting parts is formed of an elastomer and is flexible.

14. The electrical drive unit of claim 13, including a power electronics system connected with an electrical drive motor operated with high voltage by the connection device.

* * * * *